Patented June 27, 1950

2,512,993

UNITED STATES PATENT OFFICE 2,512,993

OPTICAL GLASSES

Raymond Edward Bastick and Ta-Hang Wang, Smethwick, England, assignors to Chance Brothers Limited, Smethwick, England No Drawing. Application March 28, 1946, Serial No. 657,894. In Great Britain August 4, 1944

Section 1, Public Law 690, August 8, 1946
Patent expires August 4, 1964

1 Claim. (Cl. 106—54)

This invention relates to optical glasses, and particularly glasses required for photographic lenses.

The invention comprises glasses having the following essential constituents, namely:

|  | Percent |
|---|---|
| Silica ($SiO_2$) | 21.5 |
| Boron oxide ($B_2O_3$) | 19.0 |
| Barium oxide (BaO) | 45.0 |
| Thorium oxide ($ThO_2$) | 14.5 |
| Refractive index $n_d$ | 1.650 |
| Abbe constant $v$ | 58.5 |

In the manufacture of glasses in accordance with the invention it is important that the constituents should be melted in crucibles made from material which is inert to any of the constituents, platinum crucibles being preferable.

Having thus described our invention what we claim as new and desire to secure by Letters Patent is:

An optical glass consisting of 21.5% $SiO_2$, 19% $B_2O_3$, 45% BaO, and 14.5% $ThO_2$ the values of $n_d$ and $v$ being 1.650 and 58.5 respectively.

RAYMOND EDWARD BASTICK.
TA-HANG WANG.

REFERENCES CITED

The following references are of record in the file of this patent:

UNITED STATES PATENTS

| Number | Name | Date |
|---|---|---|
| 1,943,051 | Berger | Jan. 9, 1934 |
| 2,406,580 | Bastick et al. | Aug. 27, 1946 |

FOREIGN PATENTS

| Number | Country | Date |
|---|---|---|
| 596,513 | Germany | 1934 |